US012376530B2

(12) United States Patent
Uvnäs-Moberg et al.

(10) Patent No.: US 12,376,530 B2
(45) Date of Patent: Aug. 5, 2025

(54) METHOD FOR VEGETATIVE PROPAGATION OF PLANTS

(71) Applicant: LETAVIS AB, Stockholm (SE)

(72) Inventors: Kerstin Uvnäs-Moberg, Djursholm (SE); Bengt Lundegårdh, Uppsala (SE)

(73) Assignee: LETAVIS AB, Älta (SE)

(*) Notice: Subject to any disclaimer, the term of this patent is extended or adjusted under 35 U.S.C. 154(b) by 35 days.

(21) Appl. No.: 18/001,732

(22) PCT Filed: Jun. 15, 2021

(86) PCT No.: PCT/SE2021/050583
§ 371 (c)(1),
(2) Date: Dec. 14, 2022

(87) PCT Pub. No.: WO2021/256979
PCT Pub. Date: Dec. 23, 2021

(65) Prior Publication Data
US 2023/0232749 A1 Jul. 27, 2023

(30) Foreign Application Priority Data
Jun. 16, 2020 (SE) .................................. 2050724-0

(51) Int. Cl.
*A01G 2/10* (2018.01)
*A01N 37/46* (2006.01)

(52) U.S. Cl.
CPC .............. *A01G 2/10* (2018.02); *A01N 37/46* (2013.01)

(58) Field of Classification Search
CPC .......... A01G 2/10; A01N 37/46; A01N 63/10; A01N 63/50

USPC ........................................................ 47/58.1 R
See application file for complete search history.

(56) References Cited

U.S. PATENT DOCUMENTS

| 4,885,868 A * | 12/1989 | Maynard | A01G 7/00 47/DIG. 3 |
| 5,077,934 A * | 1/1992 | Liboff | A01G 7/04 47/1.3 |
| 7,704,955 B2 * | 4/2010 | Skubatch | A61P 35/00 530/333 |
| 2006/0052248 A1 * | 3/2006 | Uvnas-Moberg | A01N 63/50 504/209 |
| 2015/0334927 A1 * | 11/2015 | Golan | A01G 17/005 800/315 |

FOREIGN PATENT DOCUMENTS

| CN | 104302663 A * | 1/2015 | ............. A01N 47/44 |
| EP | 1408761 A1 * | 4/2004 | ............. A01N 37/46 |

(Continued)

OTHER PUBLICATIONS

International Search Report and Written Opinion mailed on Dec. 23, 2021 by the International Searching Authority for Patent Application No. PCT/SE2021/050583, which was filed on Jun. 15, 2021 and published as WO 2021/256979 on Dec. 23, 2021 (Inventor—Uvnas-Moberg et al.; Applicant—Letavis AB) (11 pages).

(Continued)

*Primary Examiner* — Ebony E Evans
(74) *Attorney, Agent, or Firm* — Ballard Spahr LLP

(57) ABSTRACT

Described is a method for vegetative propagation of plants by exposing a plant material to an oxytocin solution and/or a variant and/or derivative thereof.

18 Claims, 13 Drawing Sheets

(56) References Cited

FOREIGN PATENT DOCUMENTS

| EP | 2161030 A1 * | 3/2010 | ............. A61K 38/11 |
| WO | WO-2102160 A1 * | 12/2002 | ............. A01N 63/00 |
| WO | WO-2005053381 A1 * | 6/2005 | ........... A01G 9/1086 |
| WO | WO-2005061533 A1 * | 7/2005 | ............. A01N 63/02 |
| WO | WO-2014057092 A1 * | 4/2014 | ........... A61K 38/095 |

OTHER PUBLICATIONS

Karwasara et al. "Oxytocin influences the production of glycyrrhizin from cell cultures of Linn" Plant Growth Regulation, Kluer Academic Publishers, vol. 65, No. 2, Apr. 11, 2011, pp. 401-405.

Pankaj et al. "Evaluation of cytotoix potentional of oxytocin in Allium cepa L.root tip cells" International J of Pharmaceutical and Clinical Research, Jan. 2014, pp. 36-39.

Hotumalani et al. "Effect of plant growth regulators-IAA, kinetin, and a neurotransmitter-oxytocin, on growth and development of Brassica Campestris Seedlings." International J of Engineering Science and Computing, Sep. 2016, pp. 2378-2381.

* cited by examiner

METHOD FOR VEGETATIVE PROPAGATION OF PLANTS

CROSS-REFERENCE TO RELATED APPLICATIONS

This application is a U.S. National Phase Application of International Application No. PCT/SE2021/050583, filed Jun. 15, 2021, which claims priority to Swedish Application No. 2050724-0, filed Jun. 16, 2020, each of which are hereby incorporated by reference in their entirety.

REFERENCE TO SEQUENCE LISTING

The Sequence Listing submitted Dec. 14, 2022 as a text file named "38202_0012U1_Sequence_Listing.xml," created on Dec. 13, 2022, and having a size of 2279 bytes is hereby incorporated by reference pursuant to 37 C.F.R. § 1.52 (e) (5).

TECHNICAL FIELD

The present document is within the field of horticulture and relates to the vegetative propagation of plants.

BACKGROUND

Plants can be vegetatively propagated in several different ways.

One of the most common way of obtaining vegetative propagation plants is to take a cutting of plant. The procedure usually involves cutting off a part of a plant (such as a branch or part of a branch) and planting it in soil or placing it in water for root development and establishment of a new plant. Sometimes the procedure also involves a treatment stimulating the formation of roots on the plant. Such treatment can be hormonal or non-hormonal, see e.g. CN108967159, RU2689703, RU1773360, and CN107360848.

There are also other ways of vegetatively propagating plants, such as obtaining a leaf from a plant and placing it in water or soil.

Also, so called layering methods can be used. Simple layering involves placing a stem or branch that is not removed from the plant in soil and cut it off from the plant first when roots have developed. Alternatively, air layering can be used. In air-layering, a portion of a plant stem is treated with a root stimulating hormone in a wet "bandage" to allow the formation of roots before the part of the plant is cut off below the treatment site and the treated plant stem planted.

Another option for vegetative propagation is to grow plant cells in a cell culture. This usually involves taking a parenchyma or meristematic explant, placing the explant in a growth medium with nutrients and auxin hormone. The auxin stimulates the explant to divide and form calluses. By shaking the tissue culture, the calluses are broken up, thus forming even more calluses. The calluses are then placed on a solid medium with cytokinins and exposed to light which causes the calluses to form shoots. The shoots are then moved to another solid medium which may contain auxin to allow the formation of roots. The formed plants are then planted in soil.

However, even if several methods for the vegetative propagation of plants are available, there is still a need for improved methods for vegetative propagation e.g. to decrease the time to form the new plant, to increase the yield or for plants which are difficult to propagate via vegetative propagation.

However, there is still a need for improved methods for vegetatively propagating plants.

SUMMARY

The present document provides 1 method for vegetative propagation of a plant, said method comprising
 a) providing
  i) a composition comprising oxytocin and/or a fragment and/or variant of oxytocin possessing oxytocin activity; and
  ii) a plant material;
 b) exposing said plant material to said composition comprising oxytocin and/or a fragment and/or variant of oxytocin possessing oxytocin activity thereby providing an oxytocin-treated plant material; and
 c) growing said oxytocin-treated plant material, such as in a plant growth medium or soil.

In this method, step c) is performed simultaneously with or subsequently of step b).

The plant material to be treated may be a non-herbaceous plant, such as a rose, hibiscus, grape vine, raspberry, birch, apple tree, cherry tree, pear tree, plum tree, and/or black, red or white currants.

The plant material to be treated may alternatively be a herbaceous plant, such as potato or a bulb.

The plant material may contain meristem tissue, such as a node.

The plant material may be a leaf, a branch or a stem of the plant to be propagated. Alternatively, the plant material may be a plant cell culture. The plant material may be a cutting of the plant.

Step c) in the method may be performed as simple layering or as an air layering.

The composition comprising oxytocin may be a solution, such as an aqueous solution. The concentration of oxytocin in said composition comprising oxytocin may be at least 0.05 µM, such as at least 0.1 µM, such as from about 0.05 to about 30 µM, from about 0.05 to about 20 µM, from about 0.1 to about 20 µM, from about 0.5 to about 20 µM, from about 1 to about 20 µM, from about 2.5 to about 20 µM, from about 2.5 to about 15 µM, from about 2.5 to about 10 µM, from about 5 µM to about 15 µM, from about 5 µM to about 10 µM, or from about 0.5 µM to about 5 µM.

The plant material may be exposed to the composition comprising oxytocin for a time period of about at least 6 hours, such as from about 1 day to about 100 days, from about 5 days to about 90 days, from about 5 days to about 80 days, from about 5 days to about 70 days, such as from about 5 days to about 60 days, from about 5 days to about 40 days, from about 10 days to about 70 days from about 20 days to about 70 days, from about 20 days to about 60 days, such as about 5, 10, 20, 25, 30, 35, 40, 45, 50, 55, 60, 65, 70, 80, 90 or 100 days.

The plant material may be exposed to the composition comprising oxytocin at a temperature from about 1 to about 40° C., such as from about 1 to about 35° C., from about 1 to about 30° C., from about 1 to about 30° C., from 5 to about 30° C., from about 10 to about 30° C., from about 10 to about 25° C. or from about 15 to about 25° C.

The composition comprising oxytocin may have a pH of from about 1 to about 9, such as from about 2 to about 8, from about 2 to about 7, from about 2 to about 6, from about 2 to about 5, from about 2 to about 4, from about 3 to about 5, from about 3 to about 4, such as about, 1, 2, 3, 4, 5, 6, 7, 8, or 9.

The plant material may be exposed to light for at least part of the time the plant material is exposed to said composition comprising oxytocin.

Instead of using oxytocin in the method for vegetative propagation it is possible to use a fragment and/or variant of oxytocin according to SEQ ID NO:2 possessing oxytocin activity,
wherein SEQ ID NO:2 is $X_1$-$X_2$-$X_3$-$X_4$-Asn-Cys-$X_5$-$X_6$-$X_7$-$X_8$-$NH_2$ wherein
$X_1$ is selected from the group consisting of Cys and nothing;
$X_2$ is selected from the group consisting of Tyr, Phe, and nothing;
$X_3$ is selected from the group consisting of Ile, Val, Hoph, Phe, Cha, and nothing;
$X_4$ is selected from the group consisting of Gln, Ser, Thr, Cit, Arg, and Daba;
$X_5$ is selected from the group consisting of Pro and nothing;
$X_6$ is selected from the group consisting of Ile, Leu, nothing, Val, Hos, Daba, Thr, Arg, and Cit;
$X_7$ is selected from the group consisting of Gly, nothing, and Ala;
$X_8$ is selected from the group consisting of Gly and nothing;
The method may further comprise a step of exposing the plant material to a plant growth hormone, such as auxin, said step being performed before, simultaneously with or subsequently of step b) and/or step c).
The present document is also directed to the use of oxytocin for stimulating the formation of calluses and/or roots on a plant material as defined herein.
The present document also discloses a method for stimulating the formation of roots and/or calluses on a plant material as defined herein.

Other features and advantages of the invention will be apparent from the following detailed description, drawings, examples, and from the claims.

Definitions

With the term "oxytocin" in the context of the present document is intended oxytocin having the following chemical structure.

(SEQ ID NO: 1)

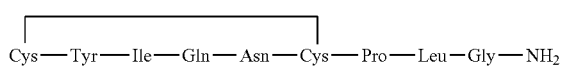

Cys—Tyr—Ile—Gln—Asn—Cys—Pro—Leu—Gly—$NH_2$

Accordingly, a "variant" of oxytocin as referred to herein, refers to a peptide which has been varied in its amino acid structure as compared to the oxytocin molecule in that some amino acid positions may have been altered by introducing other amino acids in such positions, such as natural or unnatural amino acids as exemplified herein, or it may have been extended by adding one or more natural or unnatural amino acid(s) to either ends of the peptide. In addition, other structural variations may also have been performed to the present peptides as referred to herein, such as synthetic modifications. Said "variant" still maintains a biological activity similar to oxytocin and said oxytocin variant is also stabilized by being present in a pharmaceutical composition according to the present invention.

Furthermore, a "fragment" of oxytocin, as referred to herein is a peptide which comprises a part of the amino acid sequence of oxytocin, but wherein one or more amino acids may have been removed from one or both of the amino acid terminal end(s). This term also refers to a fragment of an oxytocin variant as defined in SEQ ID NO:2, hence meaning that also encompassed by the present invention is any fragment of a peptide as presented by SEQ ID NO:2.

Thus, as used herein, a fragment and/or variant of oxytocin according to SEQ ID NO:2 is understood to be $X_1$-$X_2$-$X_3$-$X_4$-Asn-Cys-$X_5$-$X_6$-$X_7$-$X_8$-$NH_2$ wherein
$X_1$ is selected from the group consisting of Cys and nothing;
$X_2$ is selected from the group consisting of Tyr, Phe, and nothing;
$X_3$ is selected from the group consisting of Ile, Val, Hoph, Phe, Cha, and nothing;
$X_4$ is selected from the group consisting of Gln, Ser, Thr, Cit, Arg, and Daba;
$X_5$ is selected from the group consisting of Pro and nothing;
$X_6$ is selected from the group consisting of Ile, Leu, nothing, Val, Hos, Daba, Thr, Arg, and Cit;
$X_7$ is selected from the group consisting of Gly, nothing, and Ala;
$X_8$ is selected from the group consisting of Gly and nothing.

The unnatural amino acids mentioned above have the following structures:

Cyclohexylalanine, herein referred to as Cha,

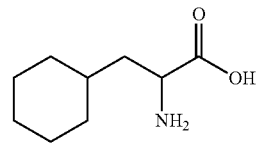 [SMILES: NC(CC1CCCCC1)C(=O)O]

Homophenylalanine, herein referred to as Hoph,

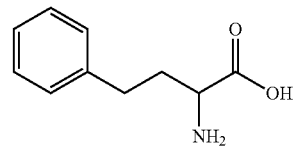 [SMILES: NC(CCc1ccccc1)C(=O)O]

Citrulline, herein referred to as Cit,

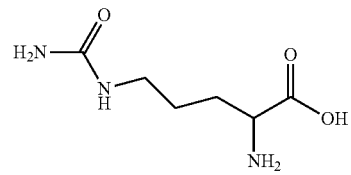

Diaminobutyric acid, herein referred to as Daba, and

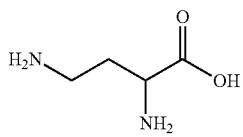

Homoserine, herein referred to as Hos,

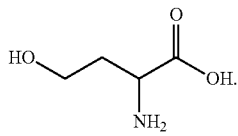

BRIEF DESCRIPTION OF DRAWINGS

FIG. 5. Number of cuttings that have received callus and roots after different times when treated in E-flasks with tap water alone or with oxytocin solution from 0.5 to 50 μM. The line above the bars shows the number of live cuttings for each concentration.

DETAILED DESCRIPTION

Figure 1:
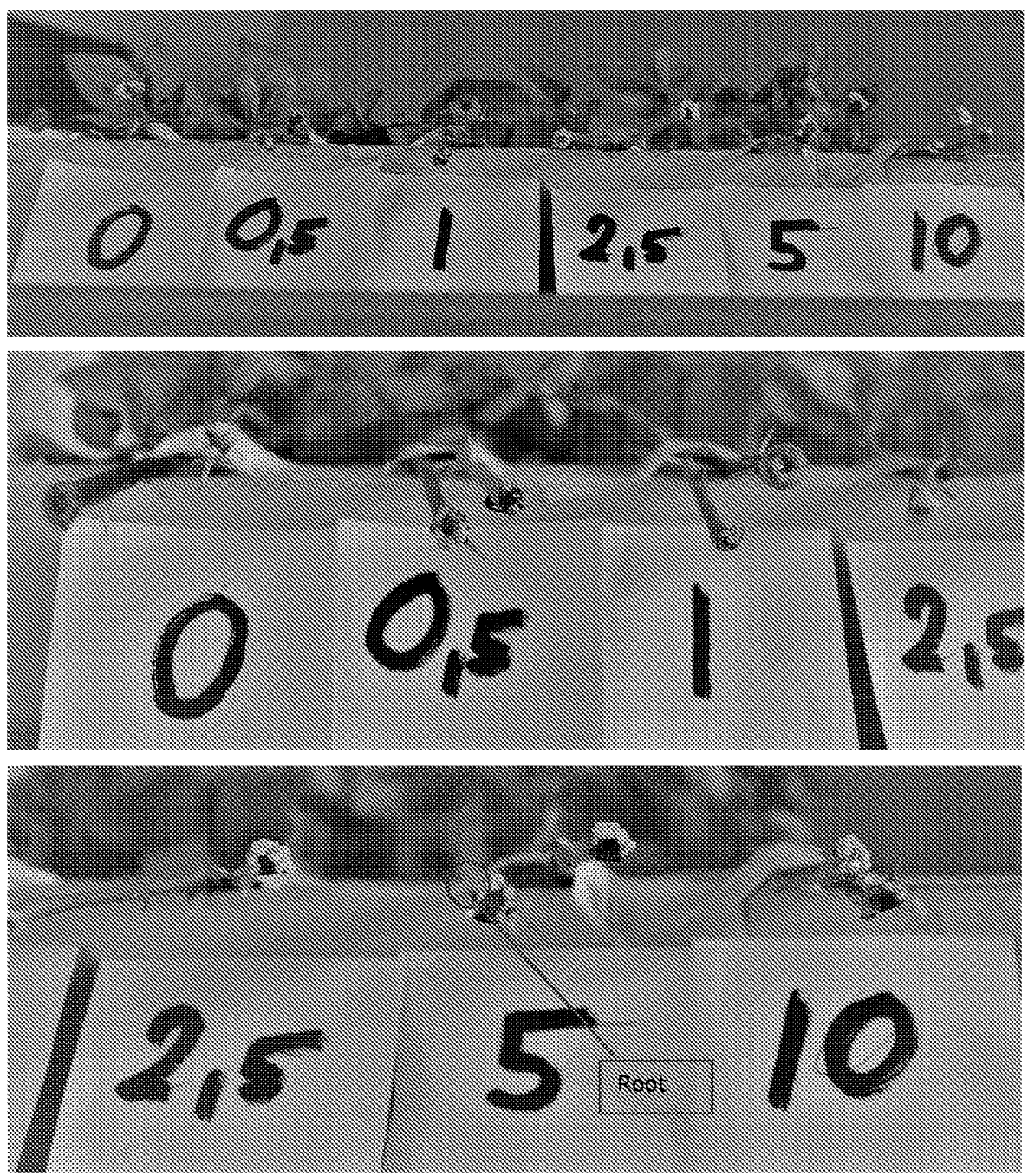
FIG. 1. Effect of the oxytocin on the formation of callus/roots on the cut surface of cuttings from rose No. 1. The concentration of oxytocin is between 0-10 μM, with a rising concentration from left to right in the pictures.

It has now been surprisingly found that oxytocin can be used for stimulating the formation of roots and/or calluses when vegetatively propagating plants. The present document thus discloses a method for vegetative propagation of a plant, said method comprising
   a) providing
      i) a composition comprising oxytocin and/or a fragment and/or variant of oxytocin possessing oxytocin activity; and
      ii) a plant material;
   b) exposing said plant material to said composition comprising oxytocin and/or a fragment and/or variant of oxytocin possessing oxytocin activity thereby providing an oxytocin-treated plant material; and
   c) growing said oxytocin-treated plant material, such as in a plant growth medium or soil.

In said method, step c) may be performed simultaneously with or subsequently of step b).

The present document is also directed to a method for stimulating the formation of roots and/or calluses on a plant material, said method comprising the same steps as the method for vegetative propagation of a plant as disclosed herein.

Oxytocin is human hormone initially linked to e.g. milk ejection and uterine contractions. It was later found to also exert a wide spectrum of effects within the central nervous system and cardiovascular functions to only mention a few effects linked to oxytocin. Oxytocin has also been found to stimulate the germination of plants by germinating the seeds in a solution containing oxytocin (WO02/102160).

Whenever "oxytocin" is mentioned in the present document, this term is also understood to encompass a fragment and/or a variant (such as a homologue) of oxytocin that encompasses a biological activity comparable to the oxytocin molecule itself (SEQ ID NO: 1), e.g. a fragment and/or variant of oxytocin according to SEQ ID NO:2. Also, the straight conformation of oxytocin, i.e. a peptide according to SEQ ID NO: 1 without the disulphide bridge between amino acids 1 and 6 is encompassed.

Plants and Plant Materials

The plant material that is to be exposed to a composition comprising oxytocin may be any kind of plant material having meristem. Meristem are regions of cells capable of division and growth in plants. Apical meristems give rise to the primary plant body. Lateral meristems are also known as secondary meristems and are responsible for secondary growth, or increase in stem girth and thickness.

The plant material may for example be a leaf, branch or a stem, or a part of a branch or a stem, of the plant that is to be vegetatively propagated.

The plant material may e.g. be a cutting of the plant. The cutting has to be taken so that at least one node is present (in order to obtain meristem material) and can be exposed to the oxytocin. It may be preferred to take the cutting from a part of the plant that is not too woody, i.e. a part of the plant that is relatively newly formed, such a shoot of the plant that is not more than a year old.

When a leaf is used as the plant material to be vegetatively propagated, it is preferable to cut the leaf vein and expose the cut leaf vein to the composition comprising oxytocin.

It may also be possible, and for some plants, such as black currant, preferred to not take a cutting but instead do a simple layering wherein a branch of the plant is bent down and part of it (a part containing at least one node) is placed in the soil. In this case, the parts placed in the soil may be treated with oxytocin before being placed in the soil, or the oxytocin may be added to the soil.

It may also be possible to do an air layering. In this case, oxytocin is typically applied in a "wet bandage" on a part of a branch containing at least one node.

The plant from which the plant material is provided may for example be a non-herbaceous plant. Non-herbaceous plants may also be called woody plants. Such plants have hard stems and buds that survive above ground in the winter in the temperate zone and include trees, shrubs (bushes) and vines. Non-limiting examples of herbaceous plants that may be used according to the present document include roses, hibiscuses, grape vines, raspberry, birches, apple trees, cherry trees, pear trees, plum trees, currants (black, red or white currant) etc.

The plant may also be a herbaceous plant. Herbaceous plants have non-woody stems and their growth above the ground largely or totally dies back during the winter in the temperate zone, although the parts of the plant that are underground may survive. Examples of herbaceous plants useful in the context of the present document include, but are not limited to, potatoes. The herbaceous plant material may be a plant material with a large vegetative underground growth, such as potato, bulbs (such as tulips, onions etc.). In the case of potatoes, the composition comprising oxytocin may stimulate vegetative propagation of the potato by stimulating the formation and/or growth of potato tubers.

The plant material may also be a plant cell culture, for example a cell culture of plant cells obtained from a plant, such as a leaf of the plant (such as a leaf bud), by mashing or mixing.

Oxytocin Compositions

The composition comprising oxytocin may a solution, such as an aqueous solution.

The concentration of oxytocin in the composition comprising oxytocin is typically at least 0.05 µM, such as at least 0.1 µM, such as from about 0.05 to about 30 µM, from about 0.05 to about 20 µM, from about 0.1 to about 20 µM, from about 0.5 to about 20 µM, from about 1 to about 20 µM, from about 2.5 to about 20 µM, from about 2.5 to about 15 µM, from about 2.5 to about 10 µM, from about 5 to about 15 µM, from about 5 µM to about 10 µM, or from about 0.5 µM to about 5 µM.

As described elsewhere herein, instead of using oxytocin (SEQ ID NO: 1), a variant or fragment of oxytocin, possessing oxytocin activity, may be used. When a variant and/or fragment of oxytocin is used, the concentration of said variant and/or fragment is the same as that of oxytocin specified herein. Further, if a combination of oxytocin and fragments and/or variants thereof is used, then the total concentration of oxytocin and the fragment and/or variant thereof is be as specified herein.

The composition comprising oxytocin may have any pH as long as this does not harm the plant material, such as a pH of from about 1 to about 9, such as from about 2 to about 8, from about 2 to about 7, from about 2 to about 6, from about 2 to about 5, from about 2 to about 4, from about 3 to about 5, from about 3 to about 4, such as about, 1, 2, 3, 4, 5, 6, 7, 8, or 9.

The composition comprising oxytocin may also contain other substances, such as nutrients, vitamins, minerals and sugar. The composition may also comprise a plant growth hormone(s), such as auxin. Alternatively, the plant material may be treated with a composition comprising a plant hormone which is not the composition comprising oxytocin. In this case, the plant material may be treated with the plant hormone before, simultaneously with or subsequently of step b) and/or step c).

Methods and Uses of Oxytocin for Vegetative Propagation and/or Stimulation of Root and/or Callus Formation The plant material may be exposed to the composition comprising oxytocin for a time period of about at least 6 hours, such as about from 1 day to about 100 days, from about 5 days to about 90 days, from about 5 days to about 80 days, from about 5 days to about 70 days, such as from about 5 days to about 60 days, from about 5 days to about 40 days, from about 10 days to about 70 days from about 20 days to about 70 days, from about 20 days to about 60 days, such as about 5, 10, 20, 25, 30, 35, 40, 45, 50, 55, 60, 65, 70, 80, 90 or 100 days. The time suitable for the propagation of a certain plant material may depend on the plant and/or the time of the year.

The plant material may be exposed to said composition comprising oxytocin at any suitable temperature. Typically, a temperature of from about 1 to about 40° C., such as from about 1 to about 35° C., from about 1 to about 30° C., from about 1 to about 30° C., from 5 to about 30° C., from about 10 to about 30° C., from about 10 to about 25° C. or from about 15 to about 25° C. is used. The temperature may depend upon the specific plant treated and its preferred growth temperature.

The plant material may be exposed to light for at least part of the time the plant material is exposed to said composition comprising oxytocin. Exposure of the plant material to light may stimulate the vegetative propagation and formation of a new plant, in particular during the time of the year when daylight is weak. The light may e.g. be from 0 to about full sunlight, i.e. about 2000 mM/m$^2$/s.

The present document is also directed to the use of oxytocin for stimulating the formation of calluses and/or roots on a plant material as defined herein.

The invention will be further described in the following examples, which do not limit the scope of the invention described in the claims.

EXPERIMENTAL SECTION

Example 1: The Effect of Oxytocin on Cuttings of Roses

Cuttings, about 7 cm long, from the top of a branch of two different roses (rose No. 1 and rose No. 2) and cut directly under a node were put into 100 ml Erlenmeyer flasks with concentrations of oxytocin from 0 to 10 µM (0, 0.5, 1, 2.5, 5 and 10 µM) in tap water. Two cuttings were added to each Erlenmeyer flask. Thereafter, the Erlenmeyer flasks were placed in a growing room under a light intensity of 800 µmol*m$^{-2}$*s$^{-1}$.

Roses

Rose No. 1

Cuttings in this experiment were taken from a garden rose bush. FIG. 1 shows the effect of oxytocin on these cuttings after 31 days in the growing room. A grading of the effect of different oxytocin concentrations on the formation of callus from the cuttings can be seen in Table 1. Callus can easily be explained as an accumulation of cells that has not developed into any specific tissue, such as root tissues. Best coverage of callus on the cutting surface of the cuttings was obtained at a concentration of oxytocin of 2.5 µM (FIG. 1).

TABLE 1

Grading of the effect of oxytocin on callus formation on cuttings from rose No. 1. Each treatment contained 2 cuttings: Grading; 0-8, where 8 indicates the formation of completely covering callus on the cut surface of both cuttings.

| | Oxytocin concentration, µM | | | | | |
|---|---|---|---|---|---|---|
| | 0 | 0.5 | 1 | 2.5 | 5 | 10 |
| Grading | 4 | 6 | 4 | 7 | 6 + one small root | 5 |

Figure 4:
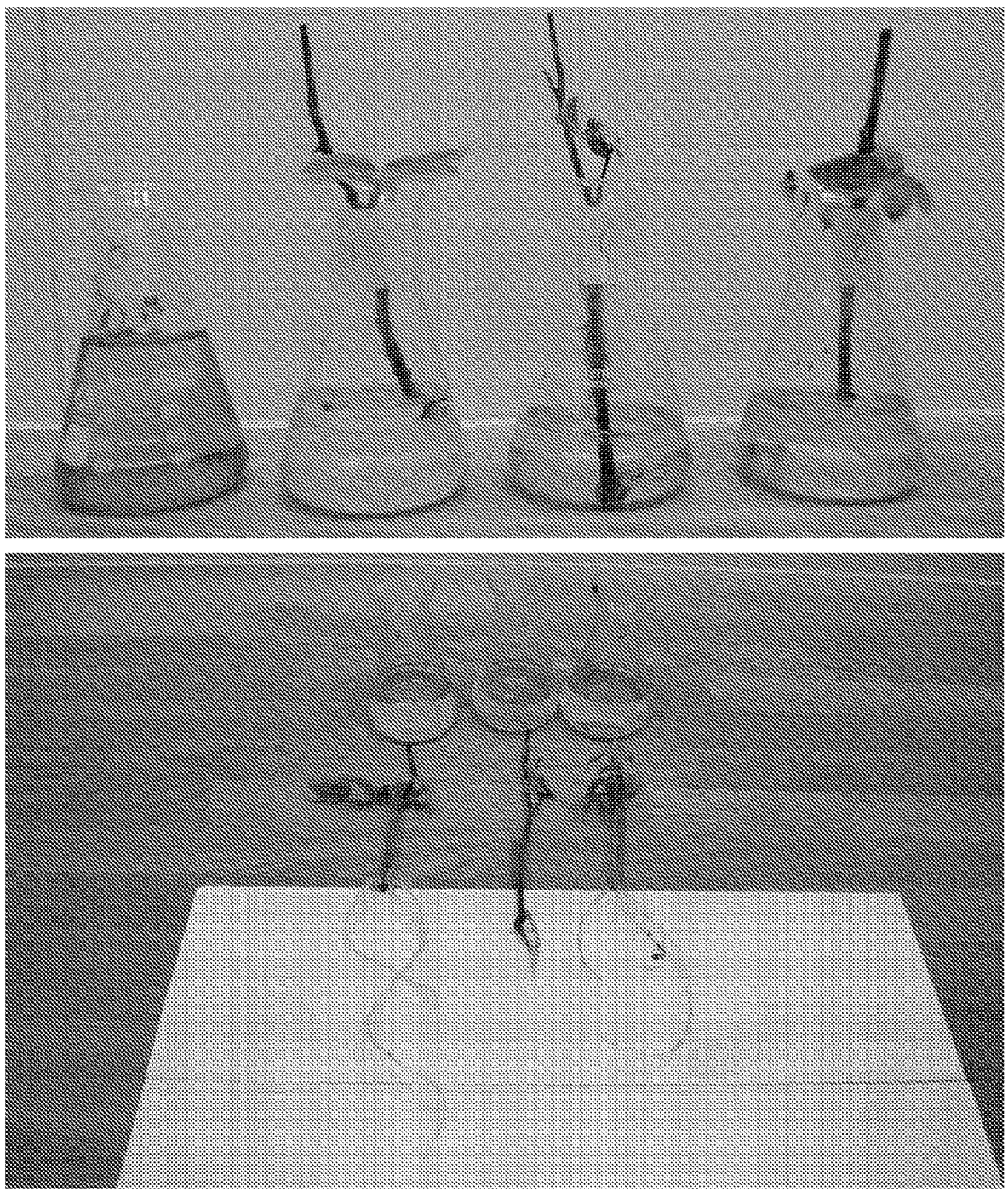
FIG. 4. Development of roots from the stem of the cut flower Furiosa. The concentration of oxytocin is between 0-8 μM, with a rising concentration from left to right in the picture.

The callus on one of the two cuttings in treatment 5 µM oxytocin had started to develop a root of about 2-3 mm, as seen in the bottommost photography in FIG. 4. Optimal concentration of oxytocin for best effect on root formation appears to be between 2.5 and 5 µM.

Rose No. 2

Figure 2:
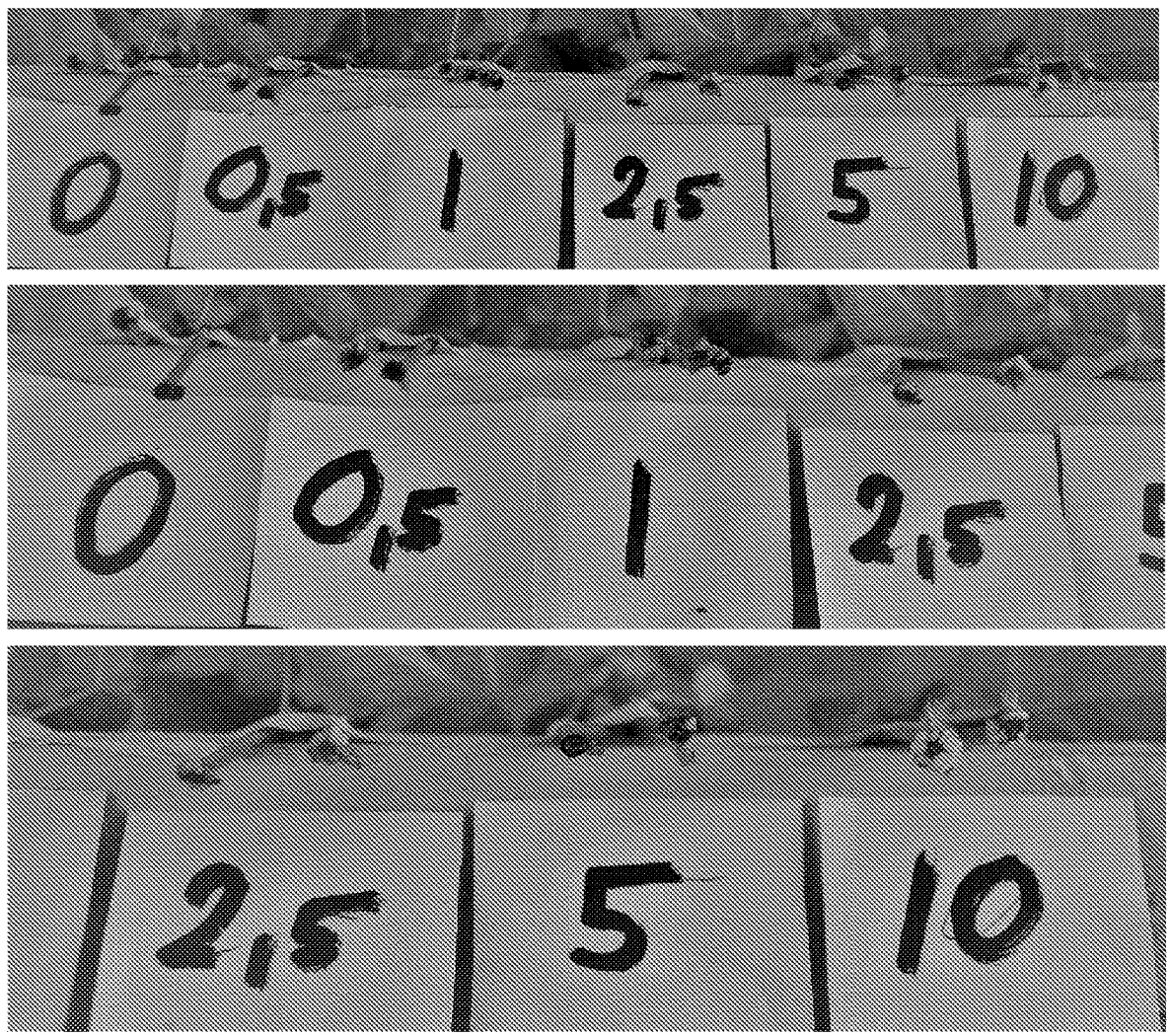
FIG. 2. Effect of the oxytocin on the formation of callus/roots on the cut surface of cuttings from rose No. 2. The concentration of oxytocin is between 0-10 μM, with a rising concentration from left to right in the pictures.

Cuttings in this experiment was taken from the small rose bushes in pot bought in a flower shop (mini rose), and put into Erlenmeyer flasks. After 24 days these roses showed a more pronounced effect of oxytocin on the development of callus than rose No. 1 (Table 2 and FIG. 2). Best effect was obtained at 10 µM oxytocin, followed closely by 2.5 µM oxytocin.

Vigorous development of callus indicates high potential for root formation. To study this effect, the Erlenmeyer flasks with the cuttings from the experiment with rose No. 2 have been covered with aluminium foil.

TABLE 2

Grading of the effect of oxytocin on callus formation on cuttings from rose No. 2. Each treatment contained 2 cuttings: Grading; 0-8, where 8 indicates the formation of completely covering callus on the cut surface of both cuttings

| | Oxytocin concentration, µM | | | | | |
|---|---|---|---|---|---|---|
| | 0 | 0.5 | 1 | 2.5 | 5 | 10 |
| Grading | 1 | 2 | 3 | 6 | 1 | 7 |

Figure 3:
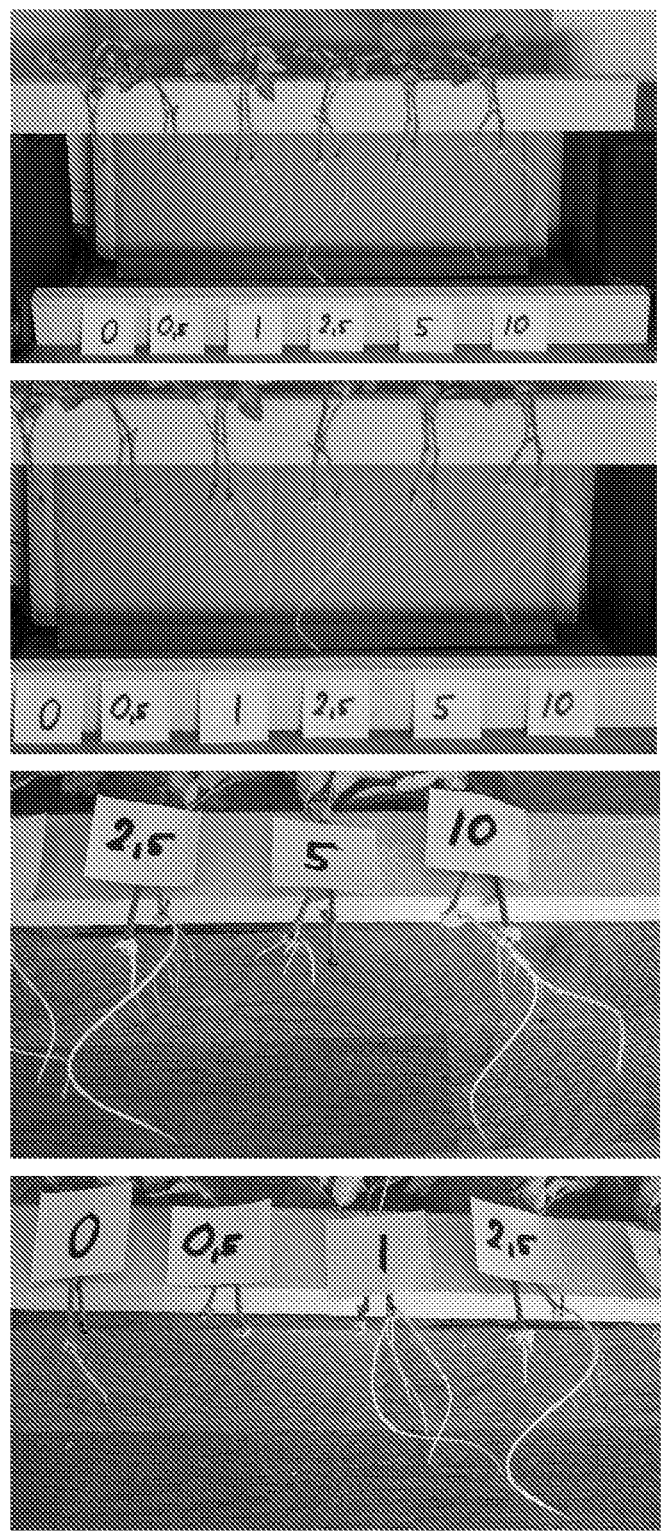
FIG. 3. Effect of the oxytocin on the formation of roots from calluses on the cut surface of cuttings from rose No. 2. The concentration of oxytocin is between 0-10 μM, with a rising concentration from left to right in the pictures. Note the formation of lateral roots from treatments 2.5 and 10 μM oxytocin. This indicates good vitality of its cuttings.

Nineteen days later, roots had been formed in all treatments except in 0.5 µM oxytocin (FIG. 3). Root development was best in the 2.5 and 10 µM oxytocin treatments. Even one of the two cuttings in 5 uM oxytocin showed root development.

In summary, the two experiments with cuttings from two different varieties of rose bushes, show a clear effect of oxytocin on the formation of callus and roots, as well as on the aging of the leaves. Higher oxytocin concentrations, 5-10 µM, inhibit leaf aging. High production of callus indicates high potential for rooting, which is visible for rose No. 2, where the oxytocin concentrations of 1-10 µM stimulated the development of roots from cuttings of this rose.

Example 2: Root Growth of Side Shoots of Cut Flowers of the Variety Furiosa

Cut flowers of roses of the variety Furiosa, which had obtained at least 2 side shoots from the stalk, were put in water to allow the side shoots to continue to grow. When the side shoots had reached a length of about 5 cm, the stalk was cut by some mm under the lowest side shoot, which was also removed from the stalk. The stalks were then put into 100 ml Erlenmeyer flasks with either water alone or an oxytocin solution. The solution contained either 1, 4 or 8 µM oxytocin. The liquid in the Erlenmeyer flasks was darkened by coating the flasks with aluminium foil. The flasks were placed in daylight. After about 2.5 months had Furiosa stalks treated with oxytocin obtained roots, while the untreated had died (FIG. 4). One month later, the roots had grown much longer on the stalks treated with 1 and 8 µM oxytocin, while the stalks in 4 µM had died due to a secondary fungal growth on the stalks. The stalk in 1 µM oxytocin showed the best root.

Example 3: The Effect of Oxytocin on Cuttings of Hibiscus

Cuttings from hibiscuses were placed in 100 ml Ehrlenmayer flasks (one cutting per flask) without oxytocin or with oxytocin of a concentration of 0. 0.5, 1, 5 or 10 mM. Five cuttings per treatment were used.

The flasks were covered with aluminum foil and the flasks were kept at room temperature in a window.

The experiment was allowed to run for 90 days whereafter the development of calluses and roots was documented.

Figure 5:
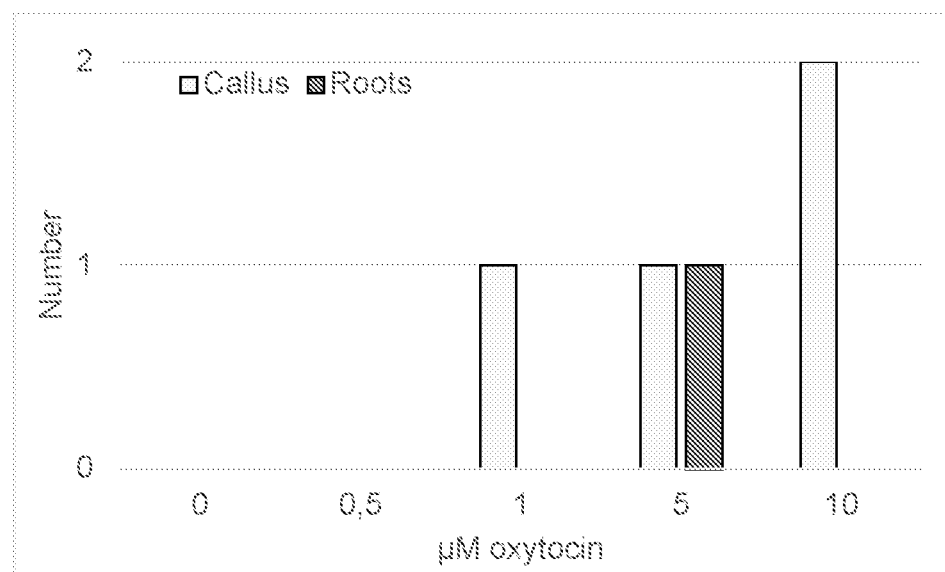
FIG. 5. Number of hibiscus cuttings that had developed calluses and roots after treatment with different concentrations of oxytocin. For each concentration, five cuttings were treated.

The cuttings treated with 1, 5 and 10 µM oxytocin showed developed calluses (FIG. 5). One of the cuttings that received treatment with 1 and 5 µM oxytocin, respectively, had developed calluses. Further, one of the cuttings treated with 5 µM oxytocin had developed a root of ca 2 mm length. Of the cuttings that received a treatment with 10 µM oxytocin, two had developed calluses.

Example 4: The Effect of Different Concentrations of Oxytocin on Cuttings of Roses Summary The study shows that oxytocin stimulates both the formation and growth of roots in rose cuttings. The fastest development of roots occurred at a concentration of oxytocin 5 µM (FIG. 6. Already after 50 days, all cuttings at this concentration had developed roots. The second fastest was developing roots at 10 µM closely followed by 50 µM. All cuttings at these concentrations had roots 4-8 days later than cuttings exposed to 5 µM oxytocin, whereas 1-2 cuttings at other concentrations never developed roots before the end of the trial after 58 days.

Figure 7:
FIG. 7. Number of roots and mm root per cutting. The two cuttings with the least root development were removed, thus the charts are based on 6 cuttings out of 8: n=6.

If instead the number of roots per cuttings and the length growth of the roots is studied, a partially different time/dose response curve was obtained. Most number of roots and longest roots were obtained with 1 µM oxytocin, while concentrations 5-50 µm exhibited slightly lower root number and length growth per cutting (FIG. 7). The fewest number and shortest lengths of roots were found for those cuttings that received no oxytocin but had only been allowed to stand tap water, closely followed by the cuttings treated with 0.5 µM oxytocin.

Method

On Feb. 11, 2020, cuttings from purchased pots with roses were put into 100 ml Erlenmeyer flasks (E-flasks) with a concentration of oxytocin from 0 to 50 µM (0. 0.5, 1, 5, 10, 20 and 50 µM). The experiment consisted of four E-flasks per concentration with two cuttings in each E-flask. The E-flasks were covered with aluminum foil and placed in a culture room. From day 45, measurements were made every 4-5 days. At day 58, the trial was interrupted.

Results and Discussion

After about 40 days, seven cuttings had died (Table 3).

at the concentration of 1 µM gives both most roots and the longest total length of roots per cutting. At concentrations higher than 1 µM, initiation is faster (FIG. 6), but the number of roots becomes fewer and the length growth of the roots goes slightly slower than at 1 µM, but still significantly better than at concentrations below 1 µM (FIG. 7). No decreasing effect of oxytocin up to concentrations of 50 µM was seen.

The trial was terminated on day 58 and Table 3 indicates the effect of oxytocin at this time on the number of live cuttings, cuttings with roots, number of roots per cuttings, mm root per cuttings, number of lateral shoots greater than 10 mm and the vitality of the cuttings. Seven cuttings did not survive the trial but died due to fungal infestation. No effect of oxytocin on survival was seen, but the number of dead cuttings appeared to be randomly distributed among the

TABLE 3

Effect of oxytocin on cuttings from rose after 58 days of treatment. Each treatment consisted of 4 E-flasks with 2 cuttings per flask (n = 8): Grading of the cuttings vitality; 0-5, where 5 indicates that all 8 cuttings are completely fresh and 0 that all 8 cuttings are dead.

| Concentration oxytocin, µM | Number of living cuttings | Number of cuttings with roots | No. roots | mm root | Number of side shoots >10 mm | Vitality |
|---|---|---|---|---|---|---|
| 0 | 6 | 5 | 3.8 | 32 | 0.5 | 2.7 |
| 0.5 | 7 | 5 | 3.3 | 43 | 0.4 | 2.6 |
| 1 | 8 | 6 | 6.9 | 119 | 1 | 3.5 |
| 5 | 7 | 7 | 6.4 | 76 | 0.6 | 2.5 |
| 10 | 7 | 7 | 5.8 | 66 | 0.5 | 2.9 |
| 20 | 6 | 5 | 5.8 | 72 | 0.5 | 2.3 |
| 50 | 8 | 8 | 6.5 | 65 | 0.4 | 3.5 |

Figure 6:
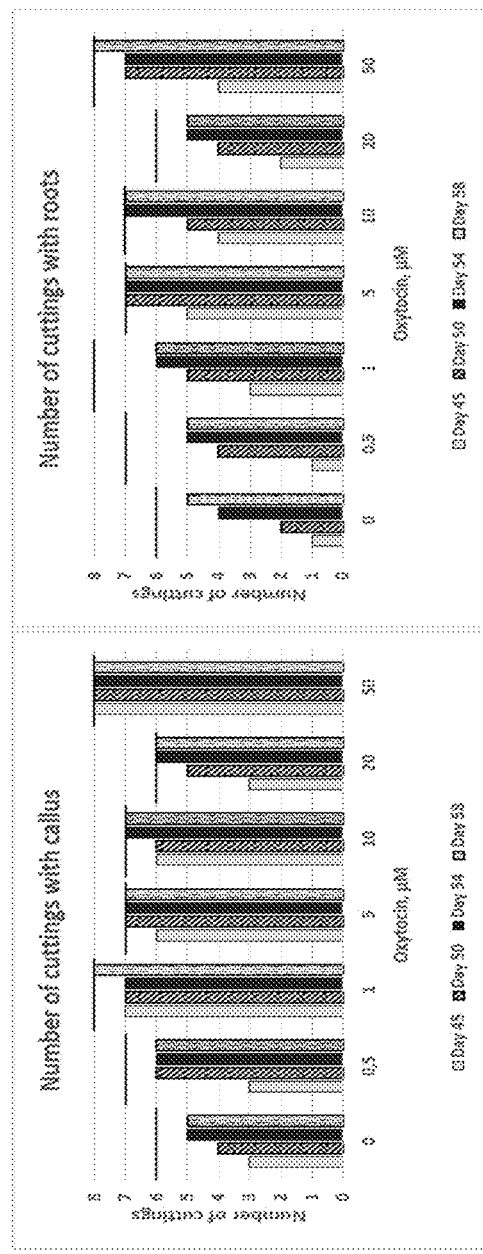

The dead cuttings were randomly distributed between concentrations. Of the cuttings that lived on day 40, some had begun to develop roots from callus, a white cell mass that indicates the precursor of root formation. By day 45, all cuttings in the 50 µM oxytocin solution had developed callus (FIG. 6). At concentrations of 1, 5 and 10 µM oxytocin, all but one of the living cuttings had calluses. This indicates that oxytocin concentrations of 1 µM and above developed a high potential, in the form of calluses, for rapid root development.

Although at the concentration of 50 µM oxytocin callus were developed on all cuttings, at 5 µM concentration of oxytocin roots formed most rapidly. Already at day 45, five out of seven cuttings had developed roots at 5 µM, and five days later, all cuttings had developed roots. The second fastest root development occurred in the cuttings exposed to 10 µM oxytocin, followed by the cuttings exposed to 50 µM oxytocin. The cuttings in tap water (0 µM oxytocin) took the longest time to form callus and roots. While all cuttings exposed to 5 µM oxytocin had roots at day 50, only two cuttings at 0 µM oxytocin had developed roots.

Figure 8:
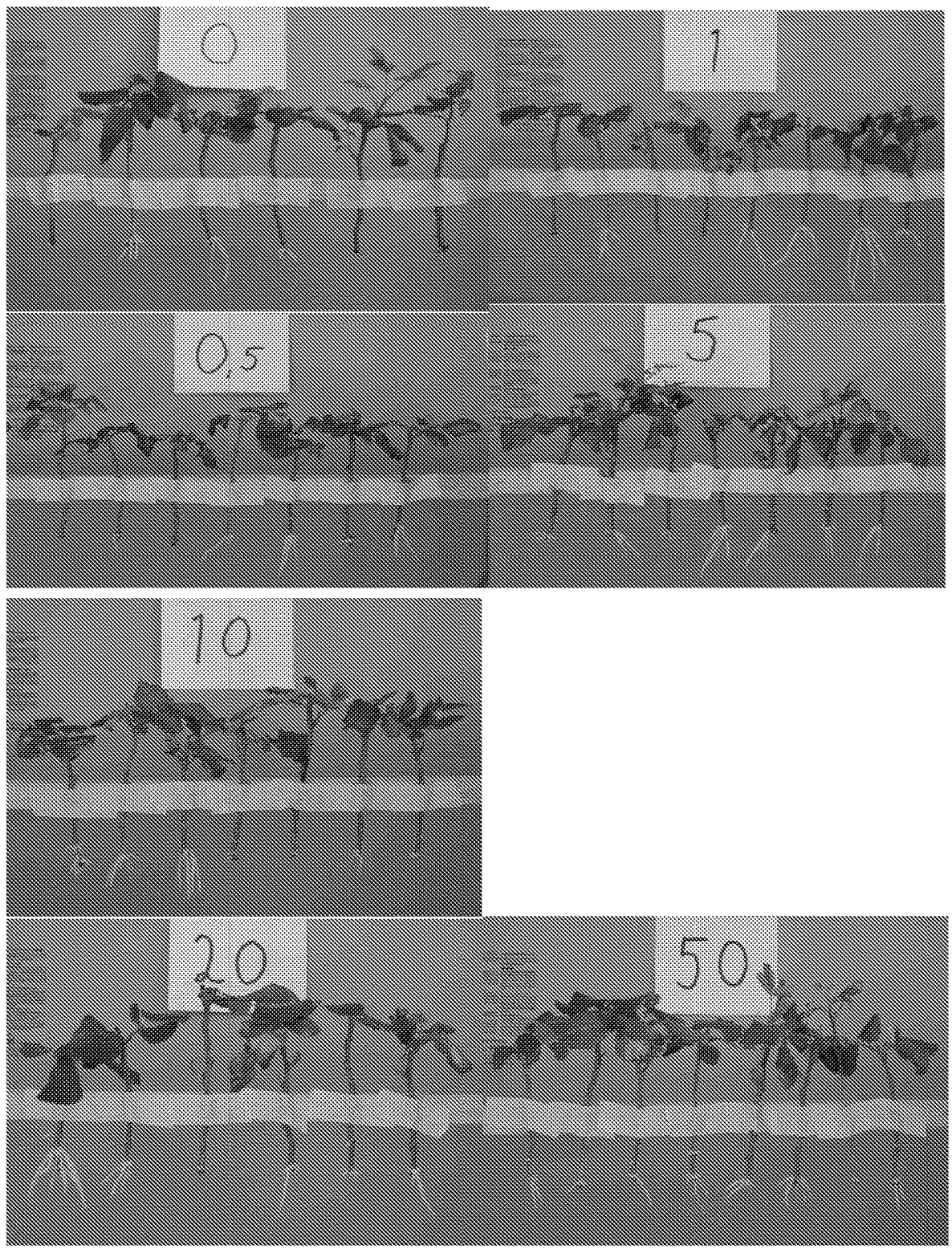
FIG. 8. Initiation of roots after 58 days in cuttings without or with oxytocin. Note the increased amount of callus and roots formed at nodes above the lower node adjacent to the cut surface.
Figure 9:
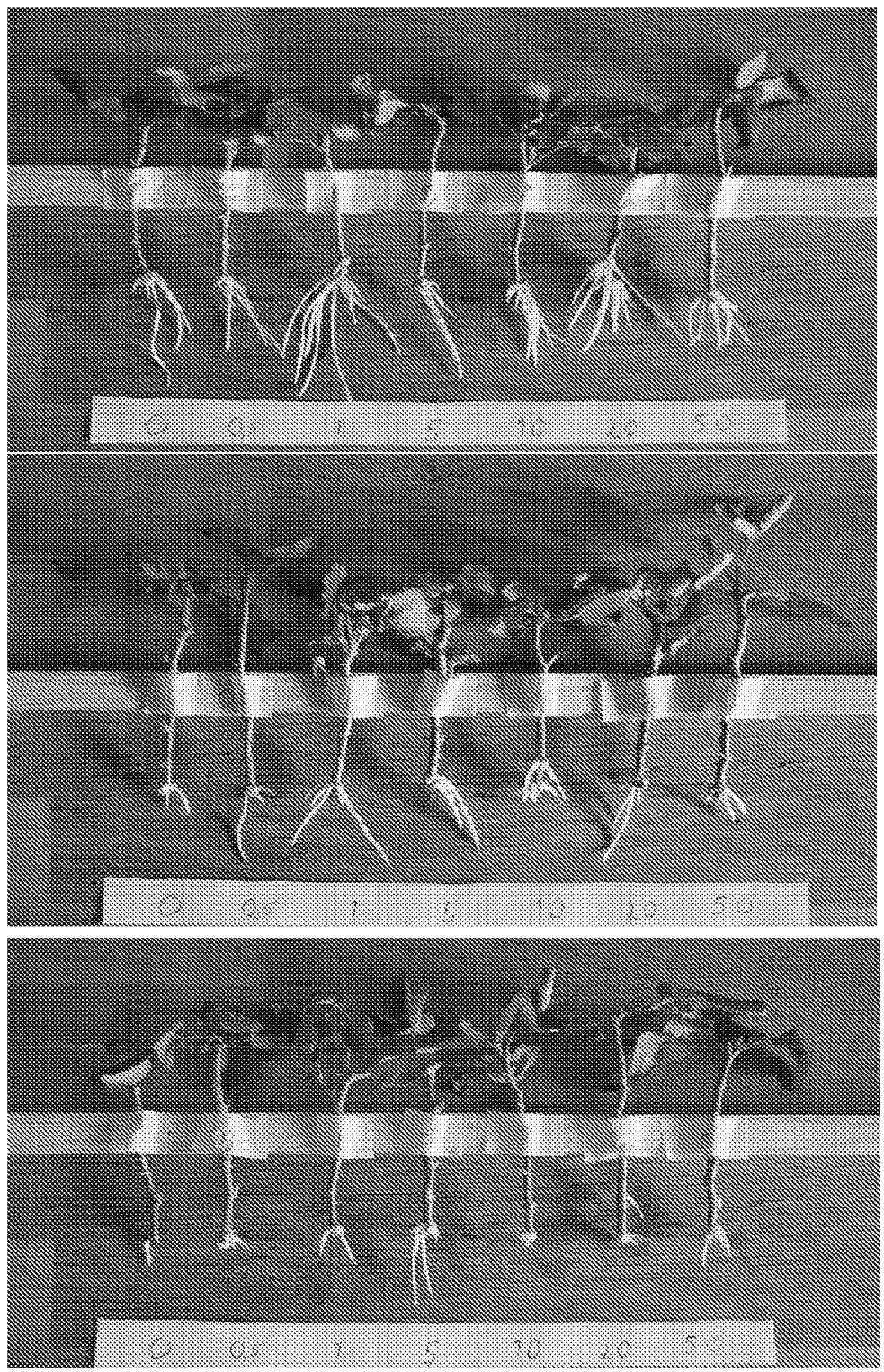
FIG. 9. Initiation of roots after 58 days in cuttings without or with oxytocin. The top image shows the cuttings that have the best root development for each oxytocin concentration. The middle image shows the third best cuttings and the bottom one the fifth best ones.
Figure 10:
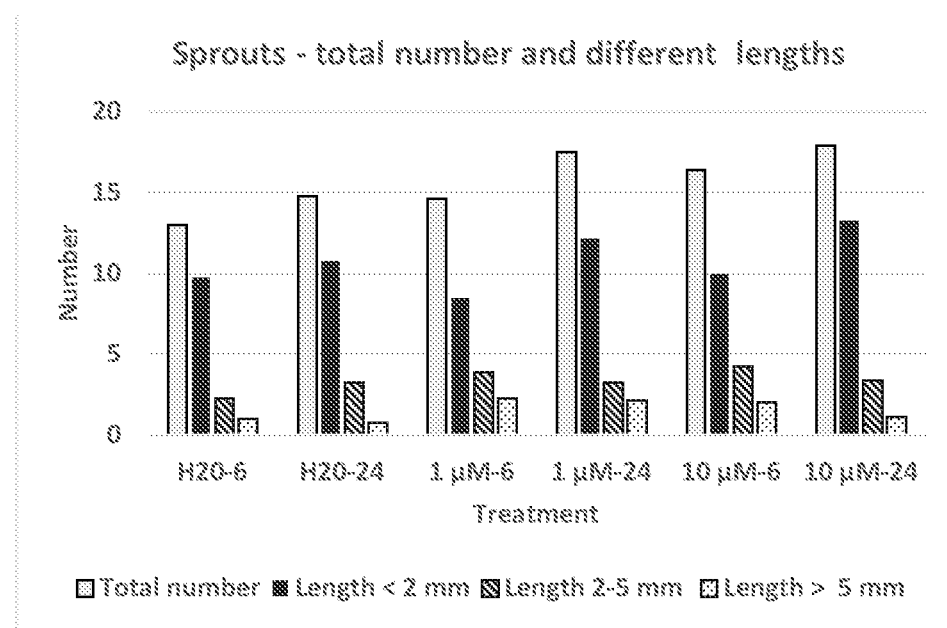
FIG. 10. Total number of sprouts and number of sprouts of different lengths (<2 mm, 2-5 mm and >5 mm) for each treatment: $H_2O$-6=tap water for 6 hours; $H_2O$-24=tap water for 24 hours; 1 μM-6=1 μm oxytocin for 6 hours; 1 μM-24=1 μm oxytocin for 24 hours; 10 μM-6=10 μm oxytocin for 6 hours; 10 μM-24=10 μm oxytocin for 24 hours.

Thus, the cuttings in 5 µM oxytocin solution were the fastest at initiating roots, but the development of the number of new roots and their length growth for each cutting did not show the same pattern. In order to get a better comparison between the concentrations in this regard, the cuttings with the least root development were removed so that each treatment contained 6 cuttings. This due to the different survival of the cuttings in the different treatments (Table 3). The graphs in FIG. 7, which indicate the average number of 6 cuttings per concentration, clearly indicate a stimulating effect of oxytocin on root formation and growth. Oxytocin concentrations. Similarly, there was no clear correlation between oxytocin concentration and the cuttings' vitality/freshness (FIGS. 8 and 9). The fact that the concentrations of 1 µM and 50 µM had the highest value in terms of vitality/freshness was due to the fact that these concentrations did not have any dead cuttings which decreased the values.

Of the cuttings that survived the experiment, all live cuttings at concentrations 1, 5, 10 and 50 µM had developed roots after 58 days (Table 3). Most roots per cuttings had developed at the concentration of 1 µM oxytocin and then at 50 µM and 5 µM. The least development of roots occurred with 0 µM and 0.5 µM oxytocin. The total length of roots per cuttings was clearly highest at 1 µM oxytocin, followed by 5 µM and 20 µM oxytocin. The shortest total length of roots per cuttings was found at 0 µM and then 0.5 µM.

If one studies the total amount of roots formed at each concentration after 58 days, the concentrations were characterized by 1 µM and above (Table 4). On average, 50.5 mm±4.5 mm roots had formed at these concentrations compared to 30 mm roots at 0 µM oxytocin. The average length of the roots was highest at 1 µM oxytocin followed by 0.5 µM. This shows that concentrations of oxytocin below 1 µM stimulated only the longitudinal growth of the roots, while both the formation of roots and the roots length growth was stimulated by 1 µM oxytocin. At concentrations of 5 µM and above, the formation of roots was still stimulated, while root growth was somewhat slowed. A high concentration (>5 µM) of oxytocin appeared to produce more even root lengths, but slightly fewer roots than concentrations between 0.5-5 µM.

TABLE 4

Effect of oxytocin on root development in cuttings after 58 days of treatment. Each treatment contained 4 E-flasks with 2 cuttings per flask.

| Concentration oxytocin, μM | Total No. roots | Root length Mean length, mm | Standard deviation |
|---|---|---|---|
| 0 | 30 | 8.6 | 11 |
| 0.5 | 26 | 13.3 | 11.6 |
| 1 | 55 | 17.4 | 16.1 |
| 5 | 51 | 11.6 | 11.6 |
| 10 | 46 | 11.4 | 9.6 |
| 20 | 46 | 12.7 | 11.8 |
| 50 | 52 | 10.0 | 8.7 |

An interesting effect of oxytocin was that it could stimulate callus formation at nodes above the node at which the cuttings had been cut at high concentrations. A node is a growth point on a stem/stalk from which mainly leaves develop, but roots can also develop if the right stimuli are added. Development of callus at the nodes indicates high potential for root formation. Already at concentrations of 1 μM oxytocin, an increasing formation of callus appeared at nodes higher up on the stem (FIG. 8). From one cutting roots had even formed from such a node. This development of callus and roots increased at higher concentrations and appeared to be most potent at 20 μM oxytocin (FIG. 8).

To summarize, there was a clear effect of oxytocin on the formation of roots. The growth of the roots was already stimulated at low concentrations of oxytocin <1 μM. At higher concentrations, the formation of roots was also stimulated, which was seen in the rapid development of roots at 5 μM oxytocin. Already at day 50, all cuttings at this concentration had developed roots, while only two cuttings had developed roots at the same time point with 0 μM oxytocin. Eight days later, not all cuttings had roots at 0 μM oxytocin. At concentrations higher than 5 μM, callus and root formation were still relatively rapid, but somewhat slower than at 5 μM.

There appeared to be a peak for stimulation of root formation and root growth between 0.5 and 5 μM oxytocin. At higher concentrations, root formation and root growth decreased slightly at the lowest node of the cuttings, which is adjacent to the cut surface. This decline in root formation and root growth at this node at these concentrations was offset by roots being formed at nodes higher up on the stem. As a result, total root formation and root growth of the cuttings were only marginally impaired compared to cuttings in 1 μM oxytocin (Tables 3 and 4, FIG. 7), which exhibited the strongest root formation and root growth at the lowest node (FIG. 8). This also led to the length of the roots becoming more uniform at higher oxytocin concentrations.

Example 5: Potato Tubers Treated with Tap Water or Oxytocin Solutions Before Pre-Sprouting in Sunlight Potato tubers of the summer variety Perlo were pre-sprouting in sunlight after treatment with either tap water, 1 μM oxytocin or 10 μm oxytocin for 6 or 24 hours. For each treatment, 8 tubers were treated by placing them in plastic vessels and covered them with the respective test solution. After treatment, the tubers were pre-sprouted in sunlight at about 20° C. Nineteen days later, the number of sprouts were counted for each tuber and the length per sprout was measured.

Figure 11:
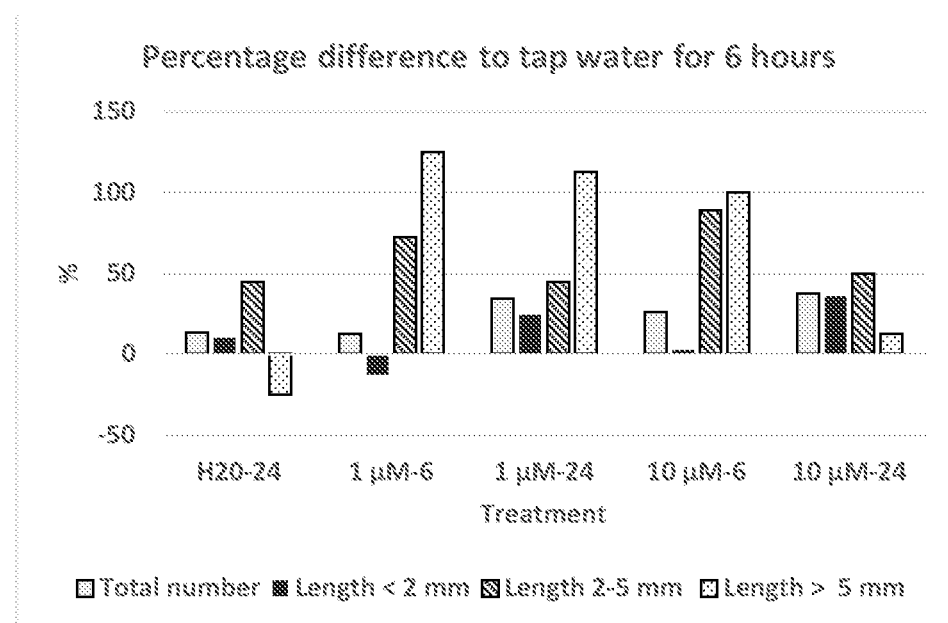
FIG. 11. Total number of sprouts and sprouts of different lengths expressed as a percentage difference to the treatment with tap water for 6 hours, $H_2O$-6: H20-6=tap water for 6 hours; $H_2O$-24=tap water for 24 hours; 1 μM-6=1 μm oxytocin for 6 hours; 1 μM-24=1 μm oxytocin for 24 hours; 10 μM-6=10 μm oxytocin for 6 hours; 10 μM-24=10 μm oxytocin for 24 hours.
Figure 12:
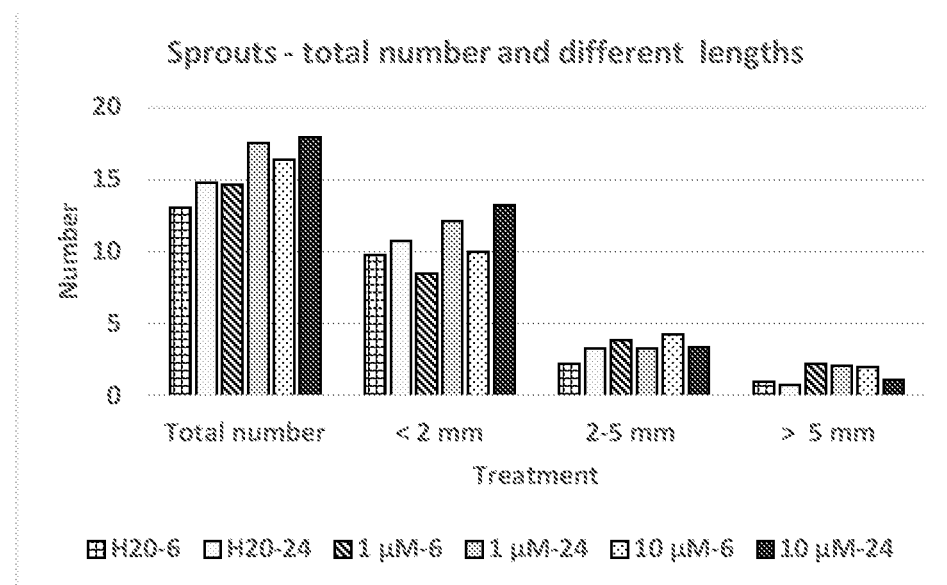
FIG. 12. Comparison between the different treatments regarding total number of sprouts and sprouts of different lengths expressed as a percentage difference to the treatment with tap water for 6 hours: H20-6=tap water for 6 hours; $H_2O$-24=tap water for 24 hours; 1 μM-6=1 μm oxytocin for 6 hours; 1 μM-24=1 μm oxytocin for 24 hours; 10 μM-6=10 μm oxytocin for 6 hours; 10 μM-24=10 μm oxytocin for 24 hours.
Figure 13:
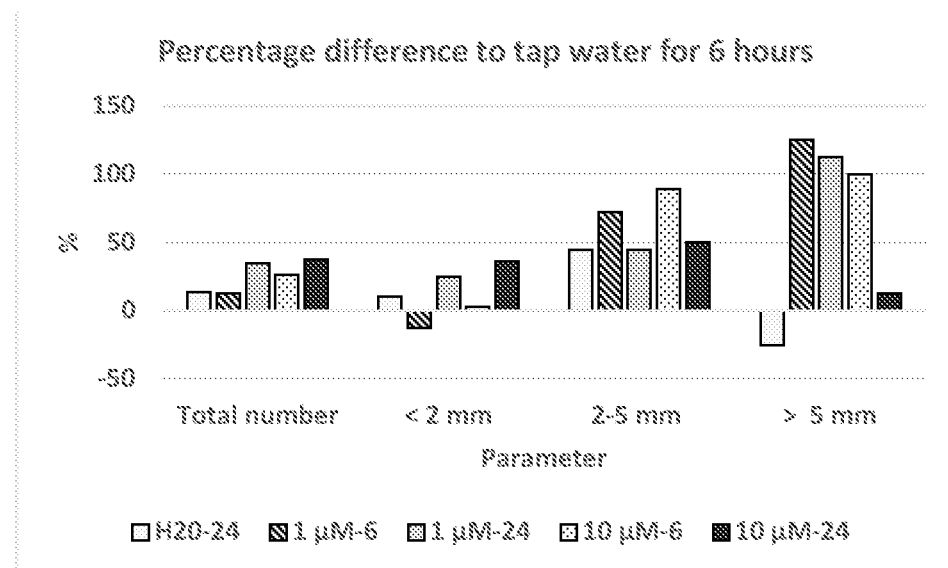
FIG. 13. Comparison between the different treatments regarding total number of sprouts and number of sprouts of different lengths (<2 mm, 2-5 mm and >5 mm): $H_2O$-6=tap water for 6 hours; $H_2O$-24=tap water for 24 hours; 1 μM-6=1 μm oxytocin for 6 hours; 1 μM-24=1 μm oxytocin for 24 hours; 10 μM-6=10 μm oxytocin for 6 hours; 10 μM-24=10 μm oxytocin for 24 hours.

The result shows that oxytocin stimulates the initiation and length growth of sprouts from potato tubers (FIGS. 10-13). Most sprouts were obtained with a treatment with 1 or 10 μM oxytocin for 24 hours. The percentage increase in number of shoots, compared to the treatment with tap water for 6 hours, was 37.5% and 34.6% for 24 hours treatment with 10 and 1 μM oxytocin, respectively (FIGS. 11 and 13).

Most sprouts with a length over 5 mm were obtained from a treatment with 1 μM oxytocin for 6 hours, followed by 1 μM oxytocin for 24 hours and 10 μM oxytocin for 6 hours (FIGS. 10-13). Percentage of long sprouts increased by 124%, 112.5% and 100% for each dose, respectively, compared to the treatment with tap water for 6 hours (FIGS. 11 and 13).

The invention claimed is:

1. A method for vegetative propagation of a plant, said method comprising
   a) providing
      i) a composition comprising oxytocin and/or a fragment and/or variant of oxytocin possessing oxytocin activity; and
      ii) a plant material, wherein said plant material comprises meristem;
   b) exposing said plant material to said composition comprising oxytocin and/or a fragment and/or variant of oxytocin possessing oxytocin activity thereby providing an oxytocin-treated plant material; and
   c) growing said oxytocin-treated plant material,
   wherein the oxytocin stimulates callus formation on the plant material.

2. The method of claim 1, wherein step c) is performed simultaneously with or subsequently of step b).

3. The method according to claim 1, wherein said plant is a non-herbaceous plant.

4. The method according to claim 1, wherein said non-herbaceous plant is a rose, hibiscus, grape vine, raspberry, birch, apple tree, cherry tree, pear tree, plum tree, and/or black, red or white currants.

5. The method according to claim 1, wherein said plant is an herbaceous plant.

6. The method according to claim 1, wherein said plant material is a leaf of said plant, a branch of said plant, a stem of said plant, or a plant cell culture.

7. The method according to claim 1, wherein said plant material is a cutting of said plant.

8. The method according to claim 1, wherein step c) is performed as simple layering.

9. The method according to claim 1, wherein step b) is performed as air layering.

10. The method according to claim 1, wherein said composition comprising oxytocin and/or a fragment and/or variant of oxytocin possessing oxytocin activity is a solution.

11. The method according to claim 1, wherein said composition comprising oxytocin and/or a fragment and/or variant of oxytocin possessing oxytocin activity has a concentration of oxytocin at least 0.05 μM.

12. The method according to claim 1, wherein said plant material is exposed to said composition comprising oxytocin and/or a fragment and/or variant of oxytocin possessing oxytocin activity for a time period of about at least 6 hours.

13. The method according to claim 1, wherein said plant material is exposed to said composition comprising oxytocin and/or a fragment and/or variant of oxytocin possessing oxytocin activity at a temperature from 1 to 40° C.

14. The method according to claim 1, wherein said composition comprising oxytocin and/or a fragment and/or variant of oxytocin possessing oxytocin activity has a pH of from 1 to 9.

15. The method according to claim 1, wherein said plant material is exposed to light for at least part of the time the plant material is exposed to said composition comprising oxytocin and/or a fragment and/or variant of oxytocin possessing oxytocin activity.

16. The method according to claim 1, wherein said fragment and/or variant of oxytocin possessing oxytocin activity comprises the amino acid sequence of SEQ ID NO:2.

17. The method according to claim 1, said method comprising a further step of exposing said plant material to a plant growth hormone, said step being performed before, simultaneously with or subsequently of step b) and/or step c).

18. The method of claim 17, wherein the plant growth hormone is auxin.

* * * * *